June 18, 1957
P. J. PETERSEN
2,796,282
SANITARY MANIPULATOR AND RETAINER
FOR MILK STRAINER FILTER DISKS
Filed April 26, 1956
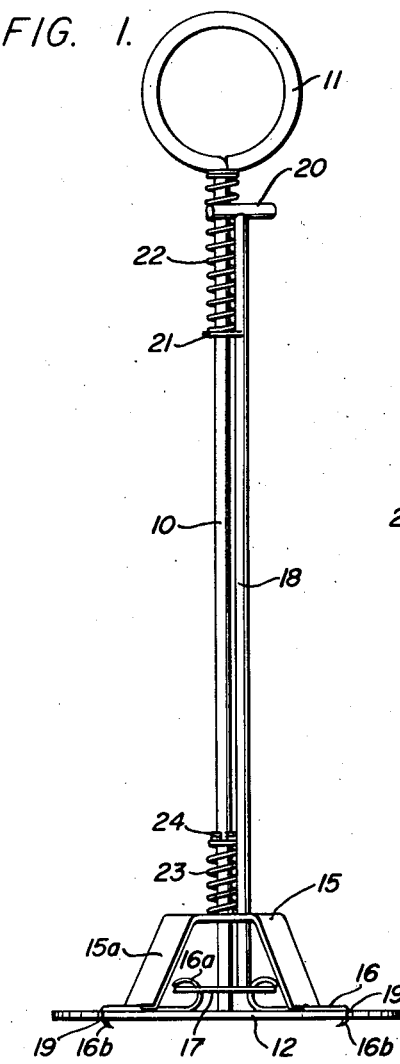
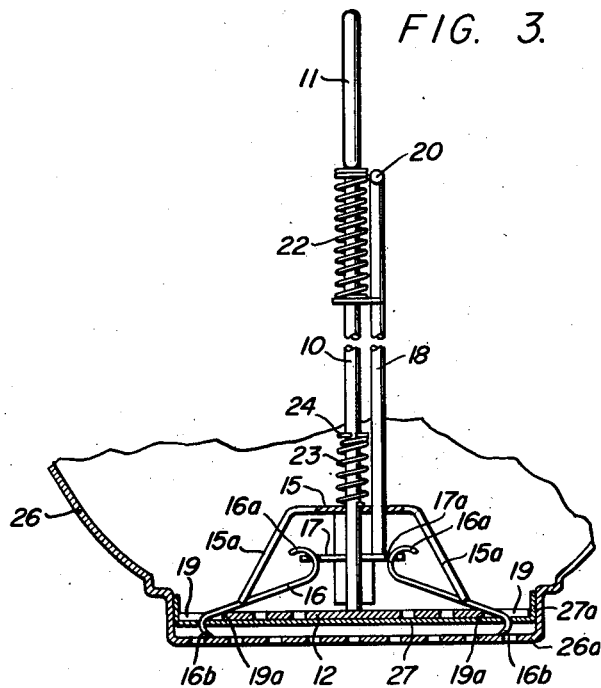
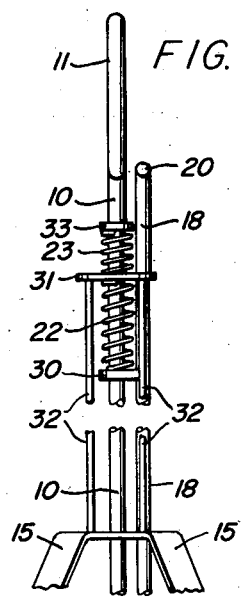
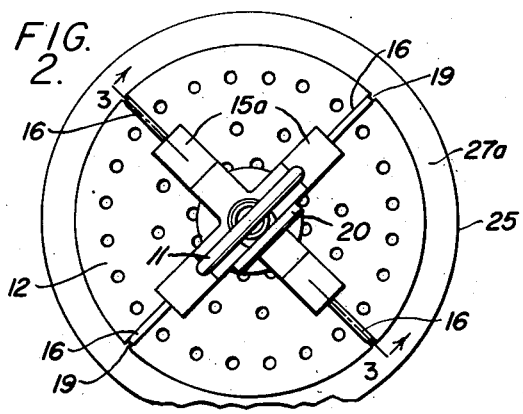
INVENTOR.
PETER J. PETERSEN
ATTORNEYS

United States Patent Office 2,796,282
Patented June 18, 1957

2,796,282

SANITARY MANIPULATOR AND RETAINER FOR MILK STRAINER FILTER DISKS

Peter J. Petersen, Salt Lake City, Utah

Application April 26, 1956, Serial No. 580,805

10 Claims. (Cl. 294—19)

This invention relates to equipment used by dairy farmers and dairies for straining milk, and is concerned with providing a sanitary manipulating implement and retainer for paper filter disks as ordinarily used in connection with milk strainers.

In dairy farming, the milk drawn from the cows manually or by milking machine is generally run into a bucket, and is then poured through a strainer into a milk can. The strainer is usually a vessel having a perforated strainer cup formation at its bottom adapted to fit into the open mouth of a standard milk can. A paper filter disk is pressed tightly into such strainer cup formation and is held therein by means of a perforated retainer having a short and rigid, bail-like, manipulating handle.

The farmer picks up a filter disk from a supply of same, and places it over the strainer cup by reaching deeply into the strainer vessel. He then grasps the retainer by its handle, and rams it and the filter disk tightly into the strainer cup. The retainer and its handle are left in place at the bottom of the strainer vessel during the straining of the milk, the milk washing over the handle as it passes.

The filter paper must be changed for each ten gallons of milk, which means that the farmer must handle both filter paper and retainer several times during the course of milking and caring for the cows. Even if his hands are carefully washed in the beginning, they can scarcely avoid contaminating the filter paper and retainer as the work proceeds. Thus, the bacteria count of the milk is raised considerably, to the farmer's loss and to the detriment of the milk consumer.

The principal purpose of this invention is to provide the dairy farmer and others who are confronted by a similar problem with an implement enabling a filter paper disk to be picked up from a supply of same, to be carried to the strainer vessel and rammed tightly into place in the strainer cup thereof, to be retained properly in such retainer cup during the straining of the milk, and to be removed from such strainer cup, all under remote manual control exercised exteriorly of the strainer vessel, whereby no part of the implement touched by the hands of the user during such remote manipulation of the filter disk is contacted by the milk being strained.

Further purposes and objects of the invention are to provide convenience and positiveness of operation for the implement, facility in washing following any use thereof, convenience in handling, and simplicity in construction.

The implement is characterized by the provision of filter disk pick-up and retaining structure at one end of an elongate rod having a carrying handle at its other end, and actuating mechanism associated therewith and terminating in a manipulative handle member adjacent the carrying handle of the rod.

Further objects and features of the invention will become apparent from the following detailed description of the presently preferred specific embodiments illustrated by way of example in the accompanying drawing.

In the drawing:

Fig. 1 represents a side elevation of one form of the implement;

Fig. 2, a top plan view of the implement as set down upon a pile of filter paper disks;

Fig. 3, a fragmentary vertical section taken centrally through the implement in filter disk retaining position in the strainer cup of a milk strainer immediately following the transfer and ramming of a filter disk, but before release of the pick-up mechanism, the section being taken on the line 3—3 of Fig. 2 so far as the implement itself is concerned, and an intermediate portion being broken out for convenience of illustration; and Fig. 4, a view corresponding to that of Fig. 1, but illustrating a somewhat different construction, the lower portion of the implement identical with what is shown in the preceding figures being broken out for convenience of illustration and intermediate portions being also broken out, as in Fig. 3.

Referring now to the embodiment of Figs. 1-3, the numeral 10 denotes a rigid rod depending from a carrying handle or grip 11, which latter is normally held by the user.

Fast on the lower end of rod 10 and extending transversely thereof is a rigid perforated plate 12, preferably circular in configuration and somewhat less in diameter than the filter paper disks to be picked up.

Slidably disposed on rod 10 and upwardly spaced from plate 12 is a rigid spider 15 having depending fulcrum legs 15a that terminate short of the upper surface of plate 12 and normally rest on respective extendible and retractable pick-up fingers 16 of stiff and preferably resilient wire.

Such fingers extend radially upon plate 12, from preferably articulate anchorage to a slide 17 fast on the lower end of a lifter rod 18 but reciprocatively mounted on rod 10.

For the purpose of such anchorage, the inner end of each finger 16 is formed as an open loop 16a, which is loosely engaged by a receiving opening 17a in slide 17.

At the outer end of each finger 16 is a downwardly directed claw 16b that passes through and works along a corresponding narrow and elongate marginal indentation 19 in plate 12, and has a fulcrum bearing on the plate at 19a. In the illustrated instance, there are four of the claw-carrying fingers 16 and, therefore, four of the claw-accommodating indentations or slots 19, see Fig. 2, although three or more than four may be satisfactorily utilized.

The lifter rod 18 is reciprocatively mounted in spider 15, and extends laterally of and in parallel with rod 10 in close proximity thereto. It terminates at its upper end in a handle 20 in operative adjacency to the carrier handle 11 of lifter rod 10, being preferably of T formation so as to be easily engaged and pulled by the forefinger and middle finger of the hand that grasps the carrier handle 11.

A guide lug 21 advantageously extends from lifter rod 18 and slidably engages rod 10, thereby not only guiding lifter rod 18 in its reciprocative movements, but also providing an abutment for one end of a compression spring 22, which serves to return such lifter rod upon release of the handle 20 following any pick-up operation of the implement. In this connection, it should be noted that spring 22 conveniently encircles rod 10 and that its upper end bears against carrier handle 11.

A second compression spring 23 is interposed between the top of spider 15 and an abutment member 24 fast on rod 10. It serves to yieldably press spider 15 downwardly, so that spider legs 15a bear firmly against the claw-carrying fingers 16 during any pick-up operation and force claws 16a to penetrate and grasp a filter paper disk. The claws are made of such length as will neatly pick-up a single filter disk from a supply pile of same.

In use, carrier handle 11 is conveniently held with the palm, thumb, and last two fingers of one hand, while the forefinger and middle finger serve to grip handle 20 at opposite sides of lifter rod 18. The implement is carried in this manner to a supply pile 25, Fig. 2, of filter paper disks, where plate 12 is centered over and set down upon the uppermost disk. It is to be noted that perforated plate 12 is just slightly less in diameter than the interior of strainer cup 26a, Fig. 3, of milk strainer vessel 26 and is sufficiently less in diameter than the filter disk to provide a free circumferential margin, see the margin 27a of filter disk 27, Figs. 2 and 3, for sealing purposes when the plate and picked-up filter disk are rammed into the strainer cup as illustrated in Fig. 3.

Pulling upwardly on lifter rod handle 20, while using carrier handle 11 as a fulcrum, lifts anchor disk 17 and pulls fingers 16 upwardly, so that their claw ends 16b dig into a filter disk and hold it securely against plate 12.

This action enables the user to transfer a filter disk 27 from the top of the pile 25 in Fig. 2 to the strainer cup 26a, to ram it thereinto, and to remove it therefrom after use, all without touching any part of the implement except the two handles 11 and 20. Furthermore, the perforated plate 12 serves as a retainer for the filter disk during use, replacing that ordinarily used for the purpose. Milk to be strained is poured into strainer vessel 26 over and about the lower portion of the implement of this invention, without danger of becoming contaminated by contact with parts of the implement handled by the farmer or other user.

While the free and open construction of the afore-described implement enables it to be easily cleaned following any use thereof, there may be some who will feel that coil spring 23 presents a difficult cleaning task. The embodiment of Fig. 4 shows how such spring may be removed from the lower part of the implement and effectively placed near the handles 11 and 20.

As illustrated, the spring 22 is here located immediately below the spring 23, exerting its resilient action between a guide lug 30 extending rigidly from lifter rod 18 and a header disk 31 rigidly supported on spider 15 by a series of long legs 32.

Lifter rod 18 extends upwardly through a receiving aperture (not shown) in header disk 31, so that its handle 20 is located proximate carrier handle 11 of rod 10, as previously described, disk 31 conveniently serving as an upper guide for such lifter rod. Spring 23 exerts its resilient action between header disk 31 and an abutment member 33 fastened to rod 10.

This construction operates in exactly the same manner as that first described.

It should be realized that the implement of the invention may be found useful for other purposes than that described herein, and that various changes may be made therein without departing from the essential structural features defined by the claims that here follow.

I claim:

1. A sanitary manipulator and retainer for milk strainer filter disks, comprising an elongate rod having a handle at one of its ends; a perforated retainer plate for filter paper disks, said plate being rigidly affixed at its center to the other end of said rod and extending transversely thereof; a plurality of mutually spaced and extendible claw fingers disposed on the rod face of said plate and extending radially thereof, the claws thereof projecting to the opposite face of said plate; a spider slidable on said rod adjacent said plate, said spider having depending legs corresponding in number and placement with said claw fingers and extending into engagement therewith intermediate the lengths thereof; resilient means associated with said rod and constantly urging said spider toward said plate, so that the legs thereof bear firmly against said claw fingers; reciprocating means in engagement with said claw fingers and slidable along said rod for extending and retracting said fingers and said claws thereof; and actuating means in engagement with said reciprocating means, said actuating means extending into manipulative adjacency with said rod handle.

2. The device of claim 1, wherein spring retaining means is provided at a location on the rod spaced toward the handle thereof from the spider; and the resilient means is a spring reactive between the spider and said spring retaining means.

3. The device of claim 2, wherein rigid structure extends upwardly along the rod into the vicinity of the rod handle from rigid securement to the spider; and the spring is reactive between the upper end of said structure and the rod.

4. The device of claim 3, wherein the reciprocating means comprises a slide on the rod engaged by the inner ends of the claw fingers, and the actuating means comprises a lifter rod fixedly attached at its lower end to said slide and extending upwardly along the first-named rod to termination at its upper end in a handle spaced somewhat below the handle of said first-named rod.

5. The device of claim 4, wherein a return spring for the lifter rod is reactive between the latter and the first-named rod adjacent the handles of said rods.

6. The device of claim 1, wherein the reciprocating means comprises a slide on the rod engaged by the inner ends of the claw fingers, and the actuating means comprises a lifter rod fixedly attached at its lower end to said slide and extending upwardly along the first-named rod to termination at its upper end in a handle spaced somewhat below the handle of said first-named rod.

7. The device of claim 6, wherein a return spring for the lifter rod is reactive between the latter and the first-named rod adjacent the handles of said rods.

8. A filter disk manipulator and retainer for positioning in a liquid-straining vessel, comprising a perforate retainer having an undersurface for receiving a filter disk; extendable and retractable claw mechanism mounted on said retainer and operative to pick up or to release a filter disk relative to said undersurface, as the case may be; elongate handle means extending from the upper surface of said retainer; and means adjacent the upper end of said handle means and extending into engagement with said claw mechanism for operating the latter, whereby the device may be manipulated remote from said retainer and remotely positioned in and removed from the liquid-straining vessel.

9. An article manipulating implement, comprising an elongate rod having a handle at one of its ends; an article retainer plate, said plate being rigidly affixed at its center to the other end of said rod and extending transversely thereof; a plurality of mutually spaced and extendible claw fingers disposed on the rod face of said plate and extending radially thereof, the claws thereof projecting to the opposite face of said plate; a spider slidable on said rod adjacent said plate, said spider having depending legs corresponding in number and placement with said claw fingers and extending into engagement therewith intermediate the lengths thereof; resilient means mounted on said rod and constantly urging said spider toward said plate, so that the legs thereof bear firmly against said claw fingers; reciprocating means in engagement with said claw fingers and slidably mounted on said rod for extending and retracting said fingers and said claws thereof; and actuating means for said reciprocating means, said actuating means being slidably mounted on said rod and extending into manipulative adjacency with said rod handle.

10. The implement of claim 9, wherein the reciprocating means comprises a slide on the rod engaged by the inner ends of the claw fingers, and the actuating means comprises a lifter rod fixedly attached at its lower end to said slide and extending upwardly along the first-named rod to termination at its upper end in a handle spaced somewhat below the handle of said first-named rod.

No references cited.